US006932215B1

(12) United States Patent
Chang

(10) Patent No.: US 6,932,215 B1
(45) Date of Patent: Aug. 23, 2005

(54) DISC STORAGE BOX STORING TWO DISCS

(76) Inventor: Hsing-Chiou Chang, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/803,733

(22) Filed: Mar. 16, 2004

(51) Int. Cl.$^7$ .............................................. B65D 85/57
(52) U.S. Cl. ................. 206/308.1; 206/303; 206/309; 211/40; 211/55
(58) Field of Search ............................... 206/309–313, 206/308.1–308.3, 307.1, 740, 744, 425, 564; 211/40, 55; 312/9, 51

(56) References Cited

U.S. PATENT DOCUMENTS

| | | | |
|---|---|---|---|
| 1,303,299 A * | 5/1919 | Hahl | 211/40 |
| 4,869,364 A * | 9/1989 | Bray | 206/232 |
| 5,611,426 A * | 3/1997 | Warfield | 206/308.1 |
| 5,713,462 A * | 2/1998 | Hansen | 206/308.1 |
| 5,743,390 A * | 4/1998 | Pozzoli | 206/232 |
| 5,762,246 A * | 6/1998 | Drew | 224/312 |
| 5,782,348 A * | 7/1998 | Burdett | 206/308.1 |
| 5,839,575 A * | 11/1998 | Blanco | 206/232 |
| 6,648,135 B2 * | 11/2003 | Ho | 206/308.1 |
| 6,868,966 B2 * | 3/2005 | German, III | 206/349 |
| 2003/0052022 A1 * | 3/2003 | Tempongko | 206/308.1 |

* cited by examiner

*Primary Examiner*—Jila M. Mohandesi
(74) *Attorney, Agent, or Firm*—Alan D. Kamrath; Nikolai & Mersereau, P.A.

(57) ABSTRACT

A disc storage box includes a body having an inner face provided with two support seats each having an oblique shape. The inner face of the body is provided with two elastic snapping members each located at a center of the respective support seat and each having an inclined angle equal to that of the respective support seat. Thus, the storage box can be used to store two compact discs simultaneously. In addition, the two discs are inserted into and removed from the inner face of the disc storage box in an independent manner without incurring interference, thereby facilitating the user placing and taking the two discs.

12 Claims, 9 Drawing Sheets

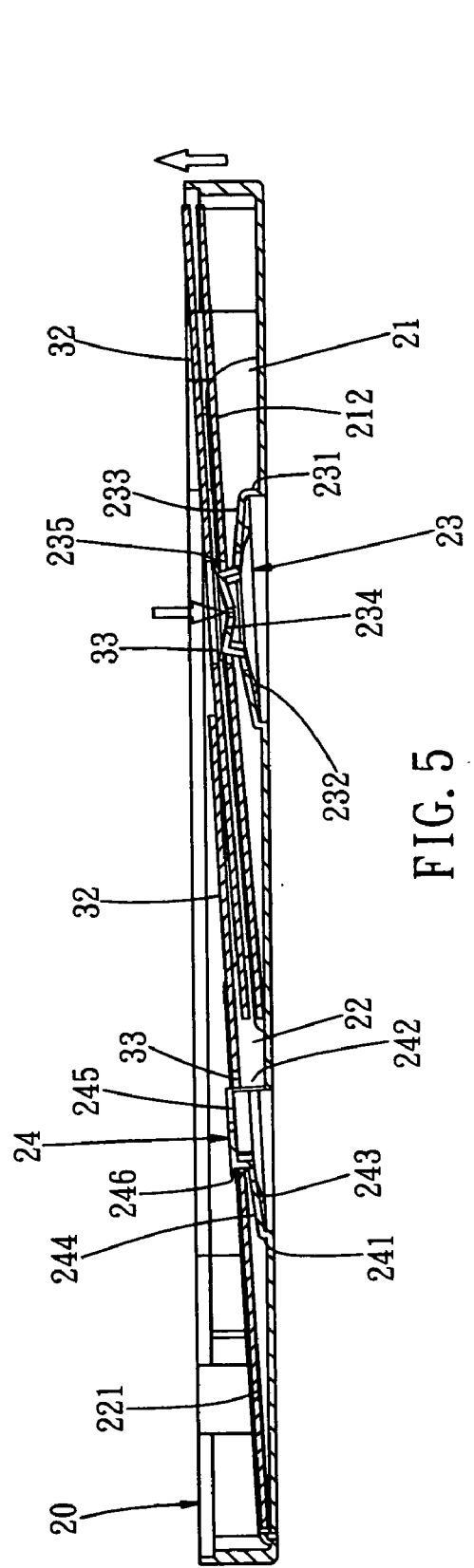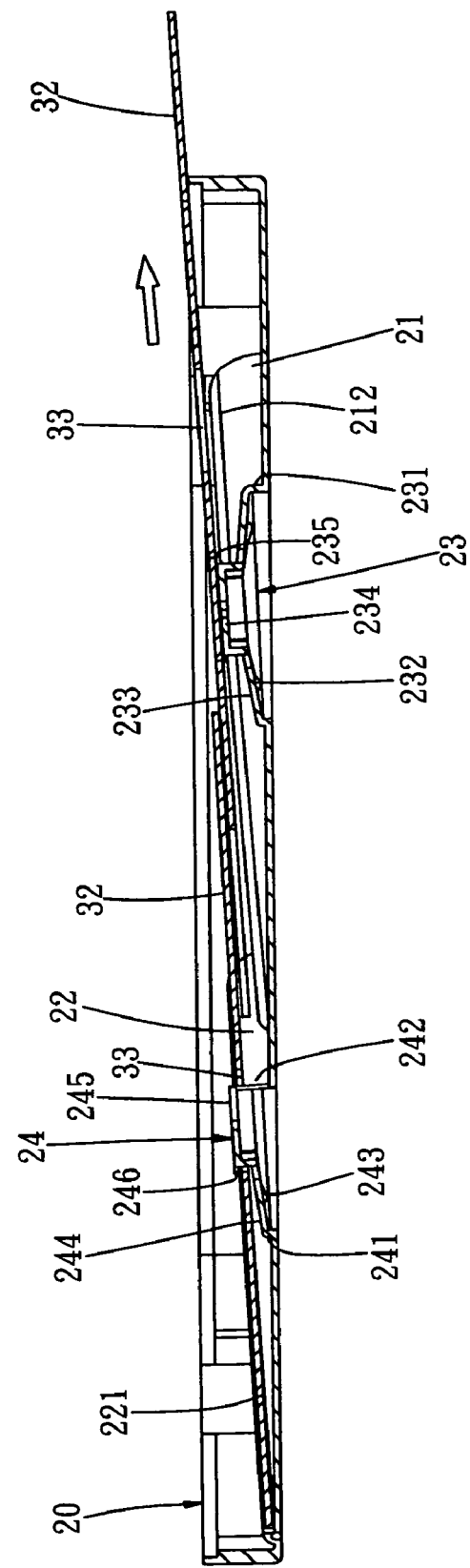

DISC STORAGE BOX STORING TWO DISCS

BACKGROUND OF THE INVENTION

1. Field of the Invention

The present invention relates to a disc storage box having an inner face that can be used to store two compact discs simultaneously, and more particularly to a disc storage box, wherein two discs are respectively inserted into and removed from the inner face of the disc storage box in an independent manner without incurring interference, thereby facilitating the user placing and taking the two discs.

2. Description of the Related Art

A conventional disc storage box in accordance with the prior art shown in FIGS. 8–11 comprises a body 10 having an inner face formed with two arcuate stepped catch walls 13 for supporting two discs 35 and two snapping members 11 for locking the two discs 35. Each of the catch walls 13 is formed with a mounting recess 12 for mounting each of the two discs 35 and has two ends each formed with an opening 131. Each of the snapping members 111 has two opposite elastic plates 111 each having a distal end formed with a snap 112 snapped into a circular hole 36 formed in each of the two discs 35. The snap 112 has a periphery formed with a locking portion 1 13 locked in the circular hole 36 of each of the two discs 35. In practice, the elastic plates 111 of one of the snapping members 11 are pressed inward to contract the snaps 112 of the elastic plates 111, thereby detaching the disc 35 from the locking portion 113, so that the disc 35 can be removed from one of the snapping members 11. As shown in FIG. 9, each of the catch walls 13 is formed with a shoulder 130, and the shoulders 130 of the two catch walls 13 have different heights with a height difference of "h" defined therebetween, so that the two discs 35 are arranged in a staggered manner as shown in FIG. 10.

However, the length of the disc storage box is increased due to the sizes of the two discs 35 and the distance between the snapping members 11 and the thickness of the disc storage box is increased due to the height difference "h" between the shoulders 130 of the two catch walls 13, so that the specification of the conventional disc storage box is different from that of the market, thereby decreasing the versatility of the disc storage box. In addition, a user has to remove the upper disc 35 from the snapping member 11 before taking the lower disc 35, thereby causing inconvenience to the user.

The closest prior art of which the applicant is aware is disclosed in U.S. Pat. No. 5,743,390, entitled "CONTAINER FOR A PLURALITY OF DISCS, PARTICULARLY FOR COMPACT DISCS", wherein the container can be used to store multiple discs. However, the container is designed to have a stepped configuration with a height difference, so that the thickness of the container is increased, thereby increasing costs of fabrication. In addition, the thickness of the container is increased, so that the specification of the container is different from that of the market, thereby decreasing the versatility of the container.

SUMMARY OF THE INVENTION

The primary objective of the present invention is to provide a disc storage box having an inner face that can be used to store two compact discs simultaneously.

Another objective of the present invention is to provide a disc storage box, wherein two discs are respectively inserted into and removed from the inner face of the disc storage box in an independent manner without incurring interference, thereby facilitating the user placing and taking the two discs.

A further objective of the present invention is to provide a disc storage box, wherein the disc storage box has a simple construction and is manufactured easily, thereby decreasing costs of fabrication.

In accordance with the present invention, there is provided a disc storage box, comprising a body having an inner face provided with a substantially C-shaped first support seat and a substantially C-shaped second support seat juxtaposed to the first support seat, wherein:

the first support seat has an oblique shape;

the second support seat has an oblique shape;

the inner face of the body is provided with an elastic first snapping member located at a center of the first support seat and having an inclined angle equal to that of the first support seat, and an elastic second snapping member located at a center of the second support seat and having an inclined angle equal to that of the second support seat.

Further benefits and advantages of the present invention will become apparent after a careful reading of the detailed description with appropriate reference to the accompanying drawings.

BRIEF DESCRIPTION OF THE DRAWINGS

FIG. 5 is a schematic operational view of the disc storage box as shown in FIG. 2;

FIG. 6 is a schematic operational view of the disc storage box as shown in FIG. 5;

DETAILED DESCRIPTION OF THE INVENTION

Figure 1:
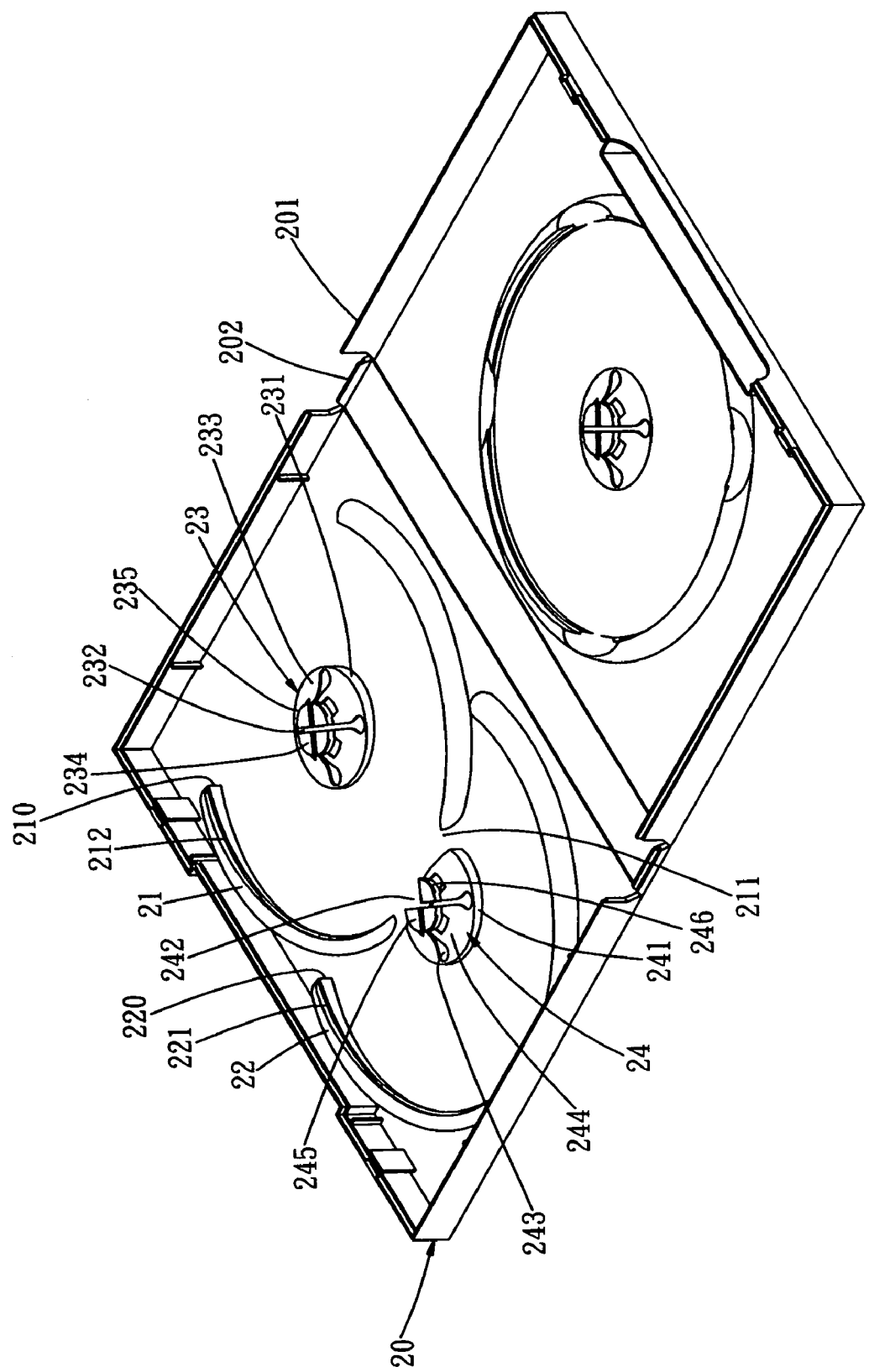
FIG. 1 is a perspective view of a disc storage box in accordance with the preferred embodiment of the present invention.
Figure 2:
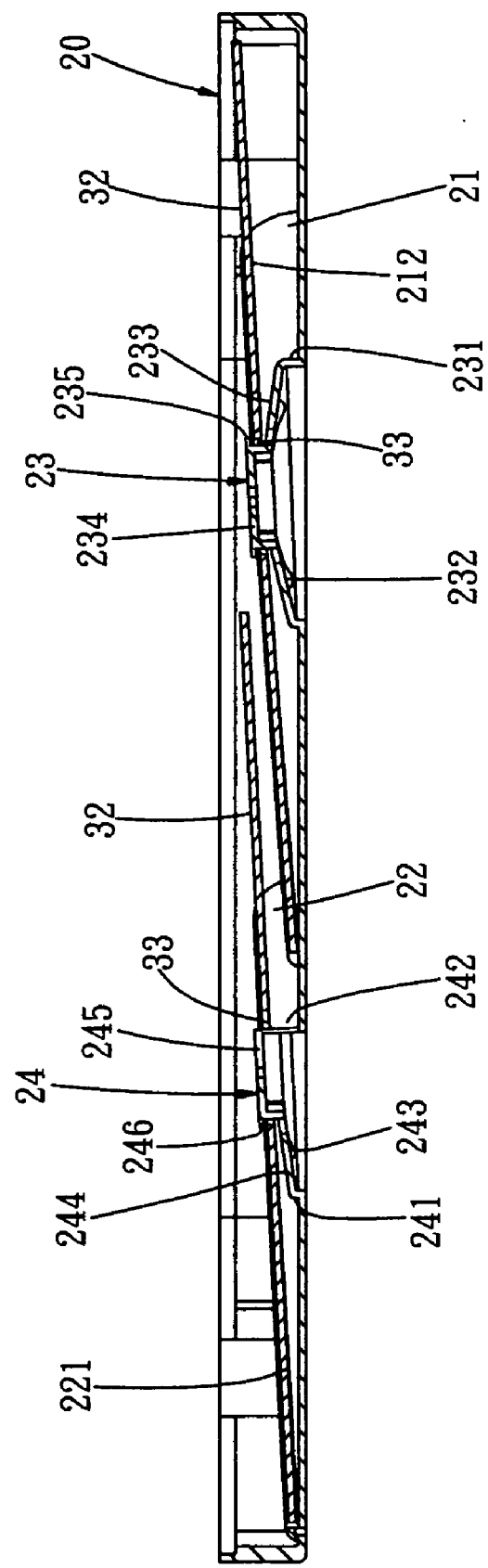
FIG. 2 is a side plan cross-sectional view of the disc storage box as shown in FIG. 1.
Figure 3:
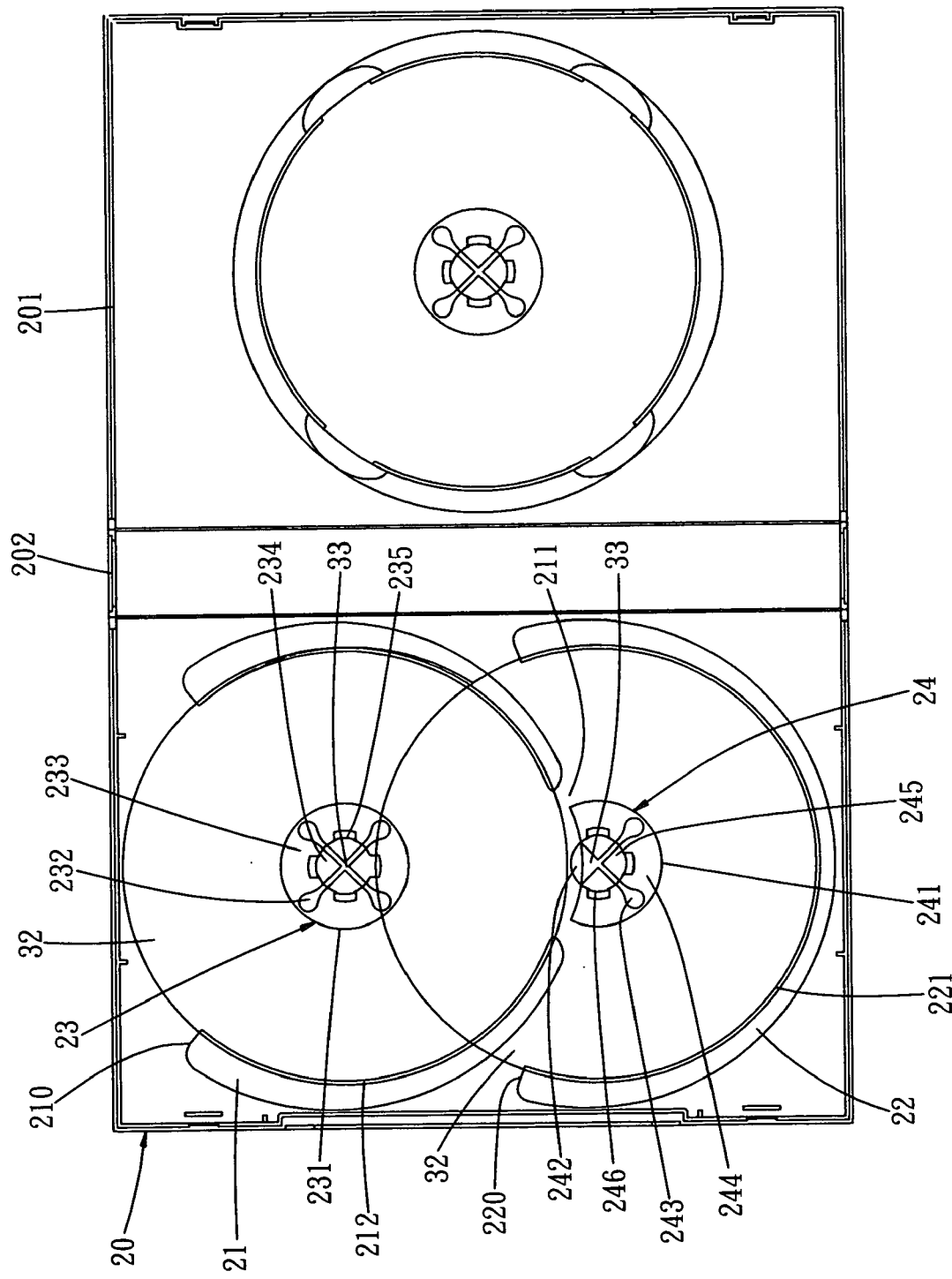
FIG. 3 is a top plan view of the disc storage box as shown in FIG. 1.

Referring to the drawings and initially to FIGS. 1–3, a disc storage box in accordance with the preferred embodiment of the present invention comprises a body 20, and a cover 201 connected to the body 20 by a connecting plate 202.

The body 20 has an inner face provided with a substantially C-shaped first support seat 21 and a substantially C-shaped second support seat 22 juxtaposed to the first support seat 21. The first support seat 21 and the second support seat 22 of the body 20 partially overlap each other.

The first support seat 21 of the body 20 is formed with a mounting recess 212 for mounting a first disc 30, and the second support seat 22 of the body 20 is formed with a mounting recess 221 for mounting a first disc 32.

The first support seat 21 of the body 20 has an oblique shape and has a height gradually increased from a mediate portion of the first support seat 21 to an opening 210 of the first support seat 21, and the second support seat 22 of the body 20 has an oblique shape and has a height gradually increased from a mediate portion of the second support seat 22 to an opening 220 of the second support seat 22. In addition, the height of the first support seat 21 is greater than that of the second support seat 22.

The opening 210 of the first support seat 21 and the opening 220 of the second support seat 22 are directed toward the same direction. In addition, the mediate portion of the first support seat 21 is extended into the opening 220 of the second support seat 22 and formed with a cutout 211.

The inner face of the body 20 is provided with an elastic first snapping member 23 located at a center of the first support seat 21 and having an inclined angle equal to that of the first support seat 21, and an elastic second snapping member 24 located at a center of the second support seat 22 and having an inclined angle equal to that of the second support seat 22.

The first snapping member 23 includes an inclined circular locking seat 231 having a side formed with a cruciform slot 232 defining four elastic plates 233 each having a movable distal end formed with a sector-shaped positioning lug 234 having a periphery formed with a locking block 235.

The second snapping member 24 includes an inclined circular locking seat 241 having a side formed with a substantially V-shaped slot 243 defining three elastic plates 244 each having a movable distal end formed with a sector-shaped positioning lug 245 having a periphery formed with a locking block 246. In addition, the locking seat 241 of the second snapping member 24 is formed with an arc-shaped cutout 242 aligning with the cutout 211 of the first support seat 21.

As shown in FIGS. 2 and 3, the first disc 30 is mounted in the mounting recess 212 of the first support seat 21 and has a central circular hole 31 closely urged on the positioning lugs 234 of the elastic plates 233 of the first snapping member 23 and locked by the locking block 235. In addition, the second disc 32 is mounted in the mounting recess 221 of the second support seat 22 and has a central circular hole 33 closely urged on the positioning lugs 245 of the elastic plates 244 of the second snapping member 24 and locked by the locking block 246. Thus, the first disc 30 and the second disc 32 are arranged in an inclined and staggered manner as shown in FIG. 2.

Figure 4:
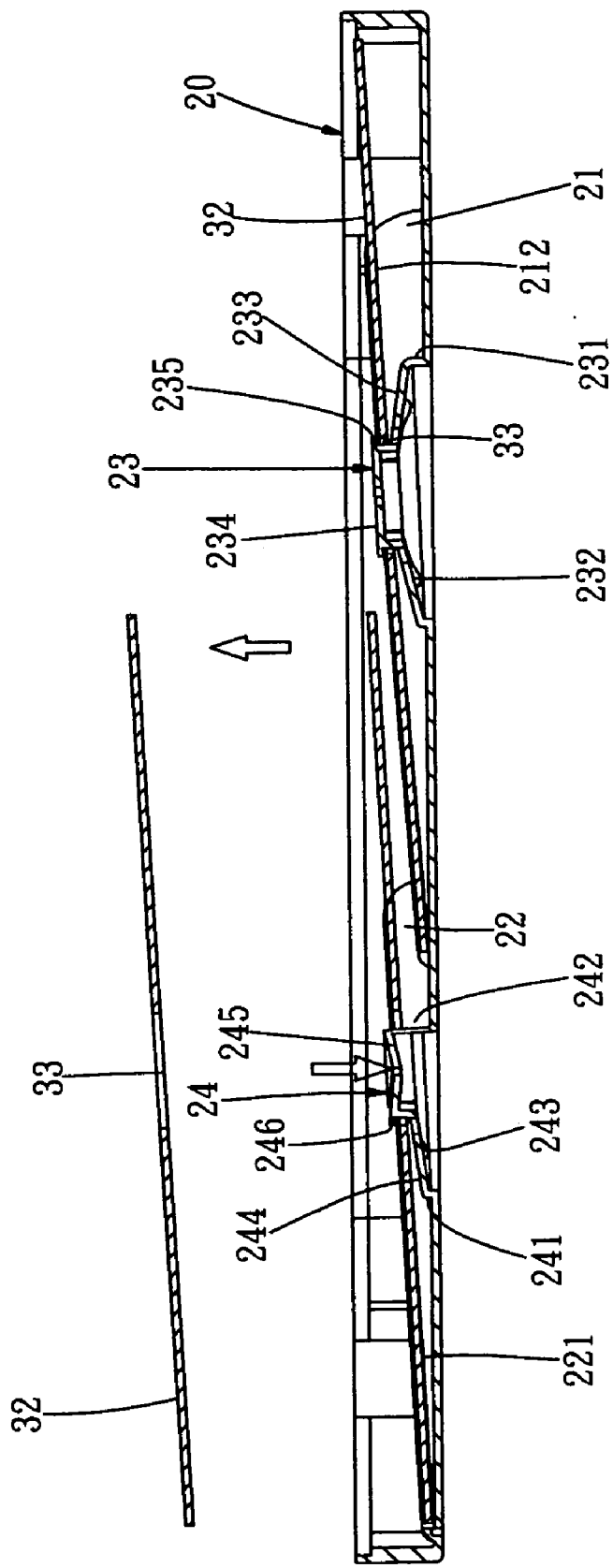
FIG. 4 is a schematic operational view of the disc storage box as shown in FIG. 2.

As shown in FIG. 4, the second snapping member 24 is pressed inward to contract the positioning lugs 245 of the elastic plates 244 of the second snapping member 24, thereby detaching the second disc 32 from the locking block 246, so that the second disc 32 can be removed from the second snapping member 24.

As shown in FIG. 5, the first snapping member 23 is pressed inward to contract the positioning lugs 234 of the elastic plates 233 of the first snapping member 23, thereby detaching the first disc 30 from the locking block 235, so that the first disc 30 can be removed from the first snapping member 23.

As shown in FIG. 6, the first disc 30 is removed from the first snapping member 23 in an inclined translation manner.

Accordingly, the inner face of the body 20 of the disc storage box can be used to store two compact discs 30 and 32 simultaneously. In addition, the arc-shaped cutout 242 of the second snapping member 24 is aligning with the cutout 211 of the first support seat 21, so that the length and thickness of the body 20 have the same specification as that of the market, thereby enhancing the versatility of the disc storage box. Further, the first disc 30 and the second disc 32 are arranged in an inclined and staggered manner, so that the first disc 30 and the second disc 32 are respectively inserted into and removed from the first support seat 21 and the second support seat 22 in an independent manner without incurring interference, thereby facilitating the user placing and taking the two discs 30 and 32. Further, the disc storage box has a simple construction and is manufactured easily, thereby decreasing costs of fabrication.

Figure 7:
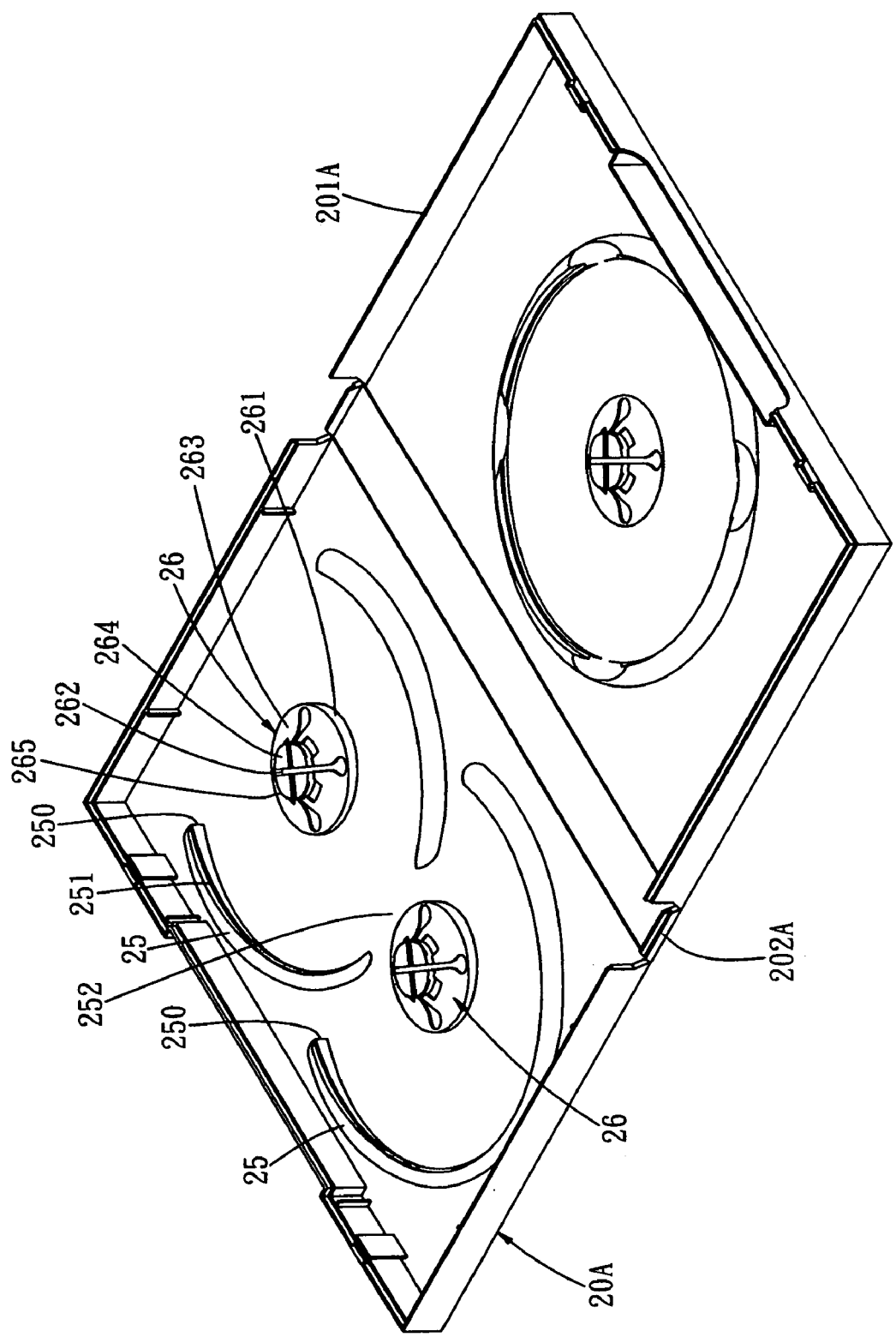
FIG. 7 is a perspective view of a disc storage box in accordance with another embodiment of the present invention.
Figure 8:
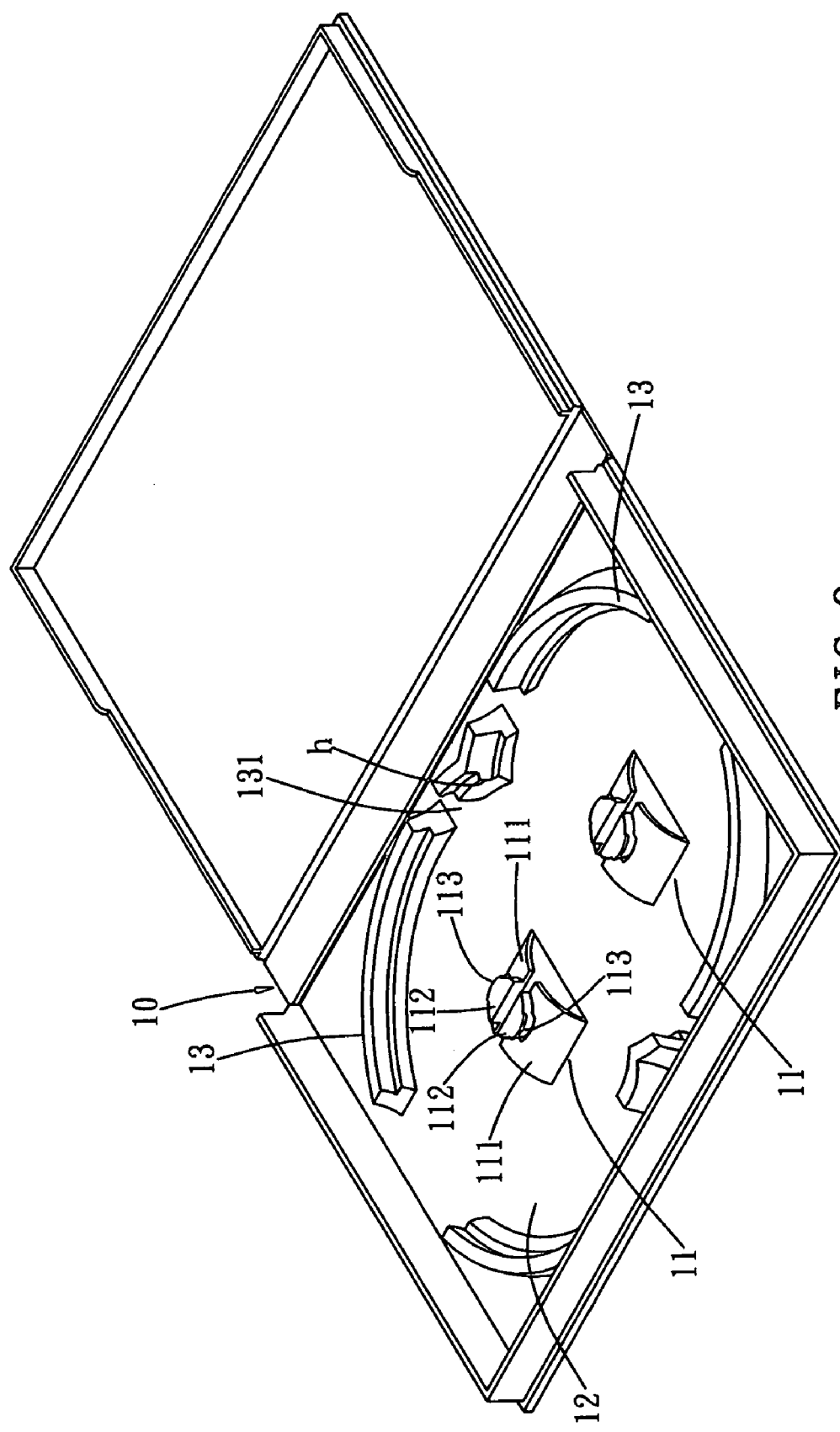
FIG. 8 is a perspective view of a conventional disc storage box in accordance with the prior art.
Figure 9:
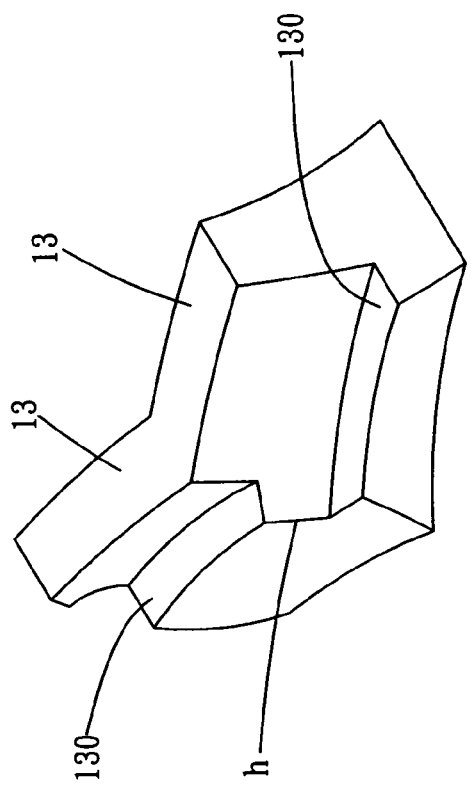
FIG. 9 is a partially cut-away enlarged view of the conventional disc storage box as shown in FIG. 8.
Figure 10:
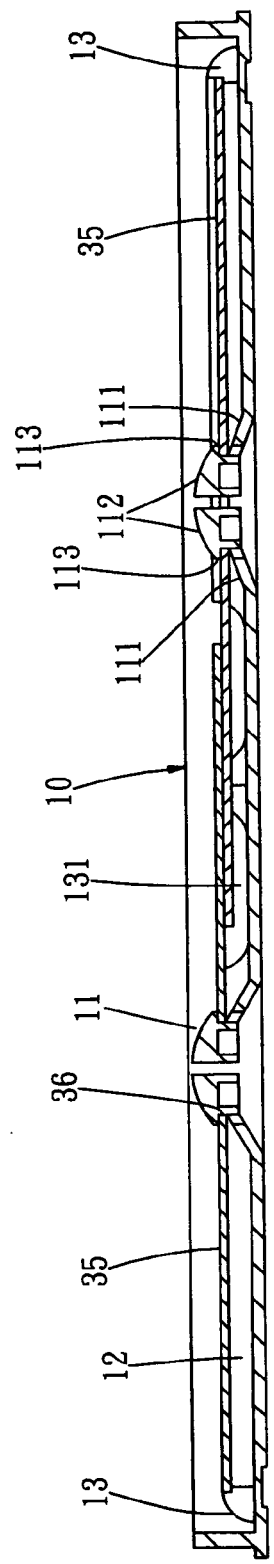
FIG. 10 is a side plan cross-sectional view of the conventional disc storage box as shown in FIG. 8.
Figure 11:
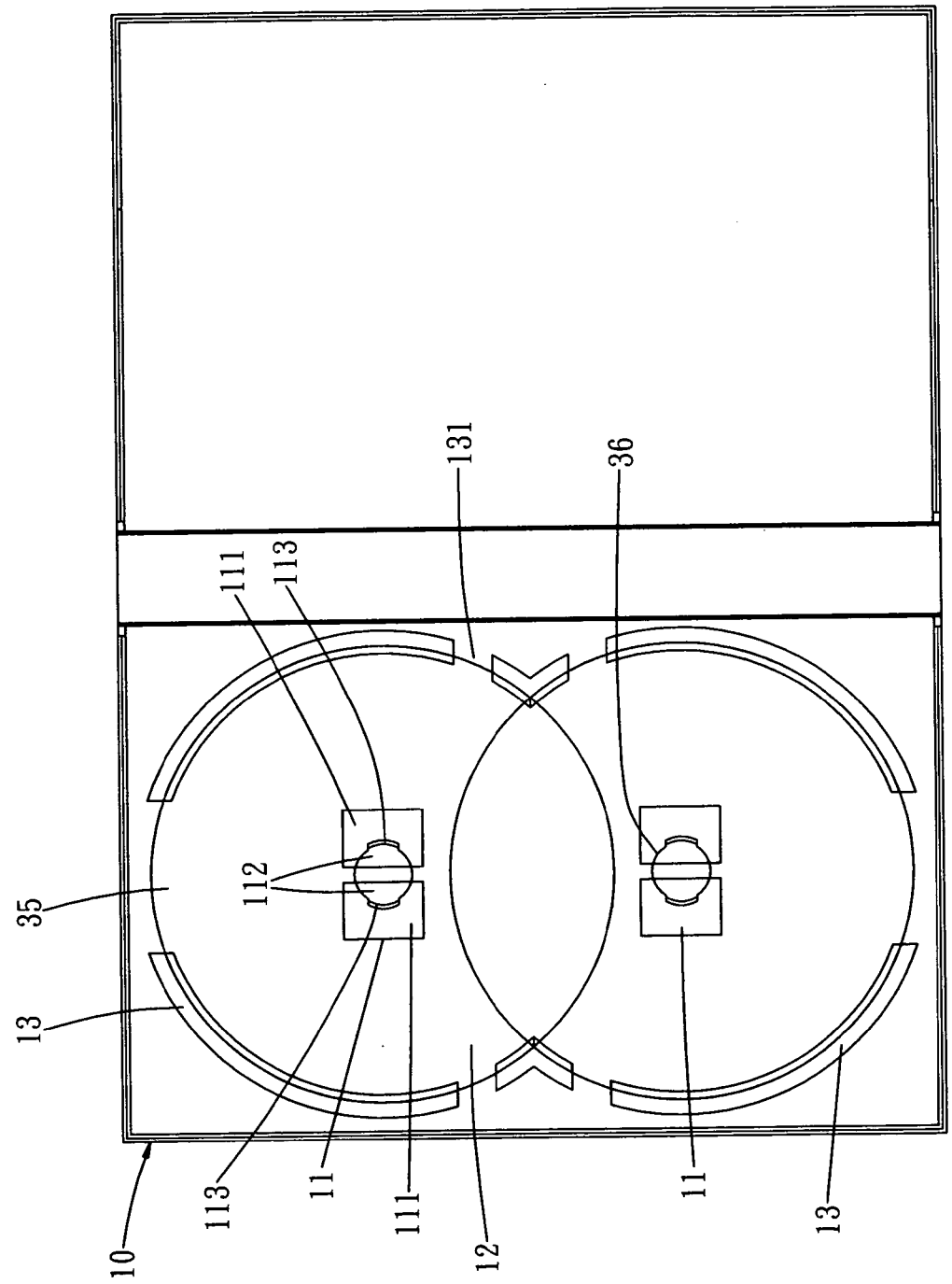
FIG. 11 is a top plan view of the conventional disc storage box as shown in FIG. 8.

Referring to FIG. 7, a disc storage box in accordance with another embodiment of the present invention comprises a body 20A, and a cover 201A connected to the body 20A by a connecting plate 202A. The body 20A has an inner face provided with two substantially C-shaped support seats 25 partially overlapping each other. Each of the support seats 25 is formed with a mounting recess 251 for mounting a disc (not shown). Each of the support seats 25 has an oblique shape and has a height gradually increased from a mediate portion of each of the support seats 25 to an opening 250 of each of the support seats 25. The openings 250 of the support seats 25 are directed toward the same direction. In addition, the mediate portion of one of the support seats 25 is formed with a cutout 252. The inner face of the body 20A is provided with two elastic snapping members 26 each located at a center of the respective support seat 25 and each having an inclined angle equal to that of the respective support seat 25. Each of the two elastic snapping members 26 includes an inclined circular locking seat 261 having a side formed with a cruciform slot 262 defining four elastic plates 263 each having a movable distal end formed with a sector-shaped positioning lug 264 having a periphery formed with a locking block 265 for locking the disc.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A disc storage box, comprising a body having an inner face provided with a substantially C-shaped first support seat and a substantially C-shaped second support seat juxtaposed to the first support seat, wherein:

the first support seat has an oblique shape;

the second support seat has an oblique shape;

the inner face of the body is provided with an elastic first snapping member located at a center of the first support seat and having an inclined angle equal to that of the first support seat, and an elastic second snapping member located at a center of the second support seat and having an inclined angle equal to that of the second support seat.

2. The disc storage box in accordance with claim 1, wherein the first support seat and the second support seat of the body partially overlap each other.

3. The disc storage box in accordance with claim 1, wherein the first support seat of the body is formed with a mounting recess.

4. The disc storage box in accordance with claim 1, wherein the second support seat of the body is formed with a mounting recess.

5. The disc storage box in accordance with claim 1, wherein the first support seat of the body has a height gradually increased from a mediate portion of the first support seat to an opening of the first support seat, and the second support seat of the body has a height gradually increased from a mediate portion of the second support seat to an opening of the second support seat.

6. The disc storage box in accordance with claim 5, wherein the height of the first support seat is greater than that of the second support seat.

7. The disc storage box in accordance with claim 5, wherein the opening of the first support seat and the opening of the second support seat are directed toward the same direction.

8. The disc storage box in accordance with claim 5, wherein the mediate portion of the first support seat is extended into the opening of the second support seat and formed with a cutout.

9. The disc storage box in accordance with claim 1, wherein the first snapping member includes an inclined circular locking seat having a side formed with a cruciform slot defining four elastic plates each having a movable distal end formed with a sector-shaped positioning lug having a periphery formed with a locking block.

10. The disc storage box in accordance with claim 1, wherein the second snapping member includes an inclined circular locking seat having a side formed with a substantially V-shaped slot defining three elastic plates each having a movable distal end formed with a sector-shaped positioning lug having a periphery formed with a locking block.

11. The disc storage box in accordance with claim 10, wherein the first support seat has a mediate portion formed with a cutout, and the locking seat of the second snapping member is formed with an arc-shaped cutout aligning with the cutout of the first support seat.

12. The disc storage box in accordance with claim 1, wherein the second snapping member includes an inclined circular locking seat having a side formed with a cruciform slot defining four elastic plates each having a movable distal end formed with a sector-shaped positioning lug having a periphery formed with a locking block.

* * * * *